May 17, 1966  J. J. MEDE ETAL  3,251,624
RESILIENT WHEEL

Filed Nov. 30, 1964  2 Sheets-Sheet 1

INVENTORS
JOHN J. MEDE
RAYMOND K. HILDEBRANDT
BY

ATTORNEYS.

May 17, 1966   J. J. MEDE ETAL   3,251,624
RESILIENT WHEEL

Filed Nov. 30, 1964   2 Sheets-Sheet 2

INVENTORS
JOHN J. MEDE
RAYMOND K. HILDEBRANDT
BY Seidel & Gonda

ATTORNEYS.

United States Patent Office 3,251,624
Patented May 17, 1966

3,251,624
RESILIENT WHEEL
John J. Mede, Mifflintown, and Raymond K. Hildebrandt, Lewistown, Pa., assignors to Baldwin-Lima-Hamilton Corporation, Burnham, Pa., a corporation of Pennsylvania
Filed Nov. 30, 1964, Ser. No. 414,618
10 Claims. (Cl. 295—11)

This invention relates to wheels, and more particularly to wheels for rail vehicles such as railroad cars, trolleys, and other vehicles adapted to have metal tires.

The wheel of the present invention is structurally interrelated in a manner to improve riding quality, decrease wear and maintenance of tire and rail by reducing transmission of noise and vibration, reduce shock and impact between tire and rail as well as between the tire and hub, and reduce thermal and mechanical stresses in the tire and hub. The tire may have any one of a variety of peripheral contours as will be made clear from the description hereinafter set forth.

In accordance with its broader aspects, the tire portion of the wheel of the present invention has radially inwardly directed circumferential projections offset with respect to and radially spaced from radially outwardly directed circumferential projections on the outer periphery of the rim. An elastomeric sound deadening material is bonded to said projections. The sound deadening material may be a resilient material such as neoprene rubber, a synthetic elastomer, a flexible epoxy, a flexible polyurethane, etc.

In accordance with a more specific aspect of the present invention, a railroad wheel is provided with a metal tire having threads or ribs on its inner diameter mated with threads or ribs on the outer diameter of the rim. Each of the threads or ribs is bonded to a sound deadening elastomer. The outer diameter of the metal tire is generally smooth and may have a radially outwardly directed flange projecting from a side edge.

It is an object of the present invention to provide a novel wheel.

It is another object of the present invention to provide a railroad wheel having improved riding qualities.

It is another object of the present invention to provide a wheel having a metal tire while reducing transmission of noise and/or vibration to and/or from the tire.

It is still another object of the present invention to provide a wheel having a layer of sound and/or vibration absorbing material between a metal tire and a metal rim.

It is yet another object of this invention to provide a novel wheel assembly.

Other objects will appear hereinafter.

For the purpose of illustrating the invention there is shown in the drawings forms which are presently preferred; it being understood, however, that this invention is not limited to the precise arrangement and instrumentalities shown.

Figure 1:
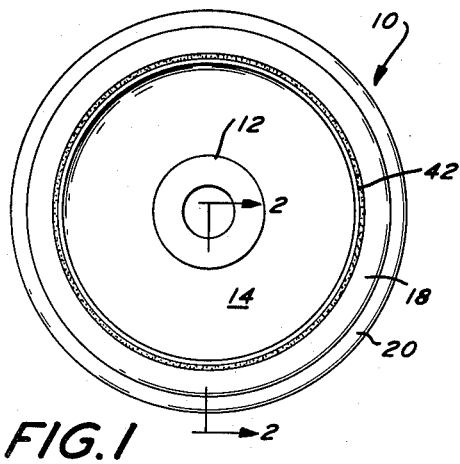
FIGURE 1 is a side elevation view of the wheel of the present invention.

In FIGURE 1 there is illustrated a railroad or other rail engaging wheel in accordance with the present invention designated generally as 10.

The wheel 10 includes a hub 12 having a bore 16 for mounting the same on an axle, not shown. The periphery of the hub 12 merges into a thin dish-shaped web 14. Hub 12 and web 14 may be made from metal such as aluminum, magnesium, steel, reinforced plastic, etc. The wheel 10 is provided with a tire 18 made from a hard metal such as steel or any suitable alloy.

Tire 18 is provided with a radially outwardly directed flange 20 on its outer periphery 22. Periphery 22 is a generally smooth surface with a slight taper 23 on the side remote from flange 20. A suitable taper would be one inch in twenty inches. As shown more clearly in FIGURE 2, the inner face 24 of the hub 12 projects further beyond the inside face of the tire 18 than the outer face 26 on the hub projects beyond the outside face of the tire 18. The wheel can be constructed in a manner such that the outer face does not project beyond the face of tire 18.

Figure 2:
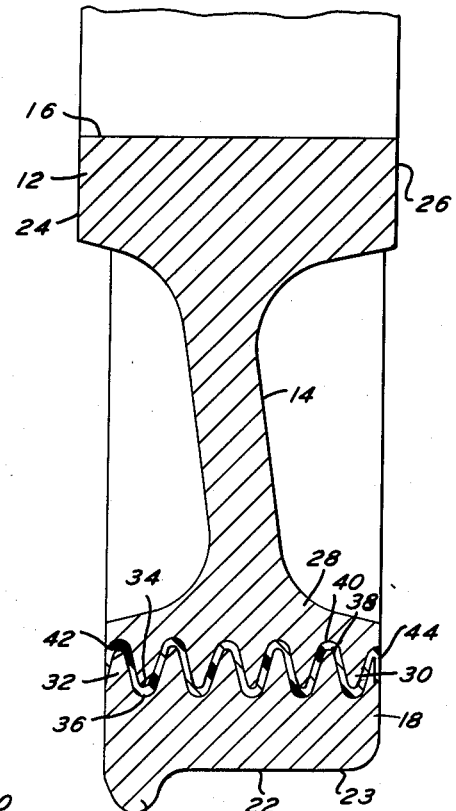
FIGURE 2 is a sectional view taken along line 2—2 in FIGURE 1.
Figure 3:
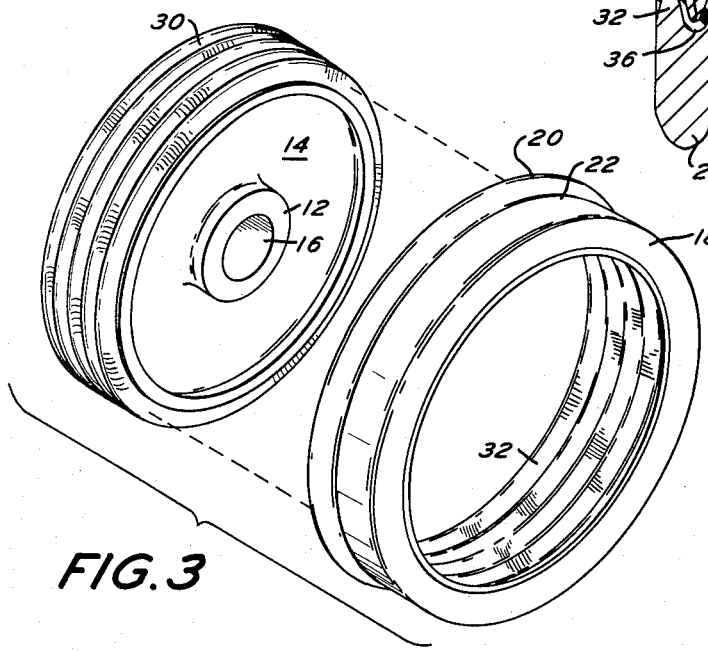
FIGURE 3 is an exploded perspective view of the wheel in FIGURE 1.

As shown more clearly in FIGURE 2, the outer periphery of the web 14 merges into a rim 28 having a width corresponding to that of the tire 18. The outer periphery of the rim 28 is provided with threads 30. The inner periphery of the tire 18 is provided with mating threads 32. The threads 30 and 32 are modified V threads. Threads 30 include rounded crests 34 juxtaposed to roots 36 of the threads 32. Threads 32 include rounded crests 38 juxtaposed to roots 40 of the threads 30.

The threads 30 and 32 are spaced from each other to provide a gap. The distance from crest to crest may be five-sixteenths to seven-sixteenths inch for a twenty-eight inch diameter wheel; with the distance between side faces of threads 30 and 32 being one-sixteenth inch. The height of the thread may be five-sixteenths inch. This structural interrelationship between the rim 28 and tire 18 is provided (1) to more than double the juxtaposed surface area and (2) to facilitate the provision of a layer of flexible or resilient sound absorbing material 42. The type of construction described effects an optimum balance of the stresses in the resilient material resulting from the shear loads due to acceleration and deceleration. It also effects a balance in the combination of compression, tension, and shear loads due to radial loads imposed by the weight of the axle. Finally it provides an optimum balance in the compression loads in axial direction from the forces acting on the web 14. The design described results in stresses in the resilient material which in effect extends the life of said material.

Material 42 is in shear to absorb acelerating and decelerating forces of the dynamic load and may absorb compression and/or tension forces on the tire 18, in addition to absorbing high frequency vibration and noise from passing between the tire 18 and rim 28. The material 42 may be any one of a variety of suitable elastomer materials such as rubber, polysulphide compositions, flexible epoxy resins, and polyurethanes, with or without appropriate fillers, etc. In order that the ring of material 42 visible on opposite sides of the wheel 10 when viewed in side elevation appear to be even or identical, tire 18 may be provided with a groove 44 which is filled with material 42.

The wheel 10 is assembled by threading the tire onto the rim 28. Thereafter, the wheel is layed flat in a jig and material 42 in liquid form is introduced in the gap between threads 30 and 32 from the bottom of the jig or fixture or introduced from the top and allowed to flow to the bottom in such manner as to expel the air out of the gap, replacing it with the resilient material. When the liquefied material 42 is visible at the upper surface of the tire and rim, introduction of the material 42, such as by pumping under low pressure, is terminated. Thereafter, the tire and rim may be heated in any convenient manner to cure the material 42 if required. When the material 42 has solidified and/or cured, it is firmly bonded to the threads 30 and 32, thereby holding the tire on the rim. The next step is to touch up the wheel by cutting or grinding off the excess material 42 so that it is flush with the side faces of the tire and rim.

Figure 4:
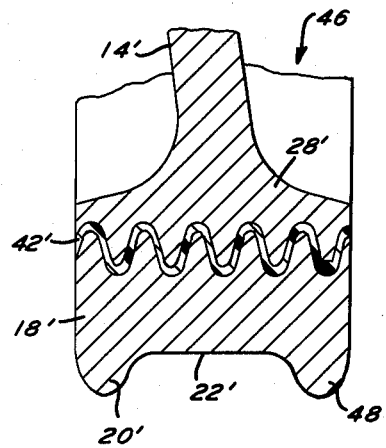
FIGURE 4 is a partial sectional view similar to FIGURE 2 but illustrating another embodiment of the present invention.

In FIGURE 4 there is illustrated a portion of a wheel 46 which is identical with wheel 10 except as will be pointed out hereinafter. Accordingly, like structure is provided with primed numerals in FIGURE 4. Tire 18' does not have taper 23 on periphery 22. Instead, tire 18' is provided with a pair of peripheral flanges 20' and 48, one on each side.

Figure 5:
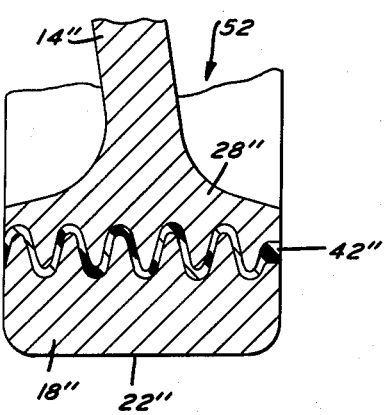
FIGURE 5 is a partial sectional view similar to FIGURE 2 but illustrating another embodiment of the present invention.
Figure 6:
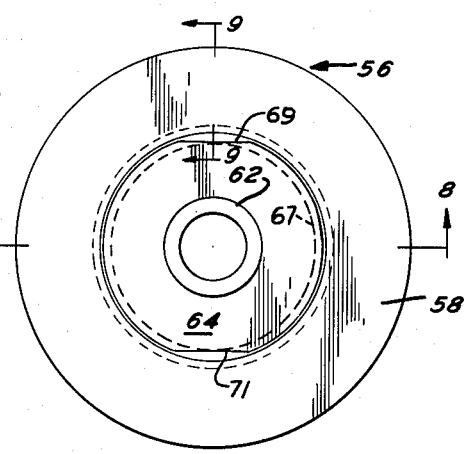
FIGURE 6 is a side elevational view of another embodiment of the present invention.

In FIGURE 5 there is illustrated another embodiment of a wheel 52 which is identical with wheel 10 except as will be made clear hereinafter. Accordingly, like structure is provided with double primed numerals in FIGURE 5. Tire 18" is provided with a smooth periphery 22".

In FIGURES 6-9, there is illustrated another embodiment of the wheel of the present invention designated generally as 56. Wheel 56 is identical with wheel 10 except as will be made clear hereinafter. Wheel 56 has a tire 58 disposed around a hub 62 and a rim connected to the hub by a web 64 in the same manner as described above. The tire 58 is made from metal as described above and may or may not be provided with substantially more "tread" than tire 18. The rim has ribs 66 on its outer periphery 67 instead of threads 30. Tire 58 has mating ribs on its inner periphery which are offset with respect to ribs 66.

Figure 9:
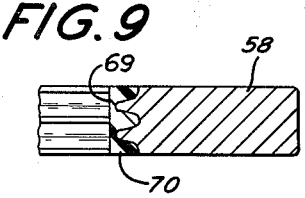
FIGURE 9 is a sectional view taken along the line 9—9 in FIGURE 6.

The inner periphery of the tire 58 and the outer periphery of the ribs 66 are circular. At diametrically opposite sides of the rim the ribs 66 have been taken down to the periphery so as to provide flat portions 69 and 71. As best shown in FIGURE 9, these flat portions provide a means whereby the hub and rim may be assembled into the tire by reason of the fact that over a sufficiently large portion of the periphery 67 of the rim there is non-interference between the ribs on the rim and tire.

Figure 7:
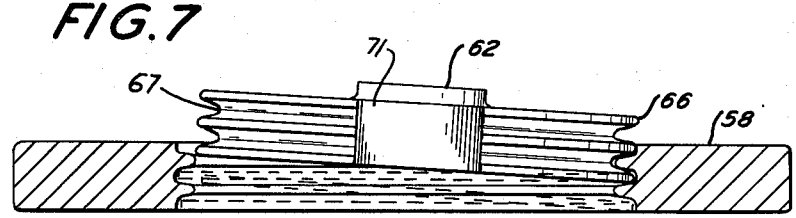
FIGURE 7 is a sectional view of the wheel in FIGURE 6, with components partially separated.
Figure 8:
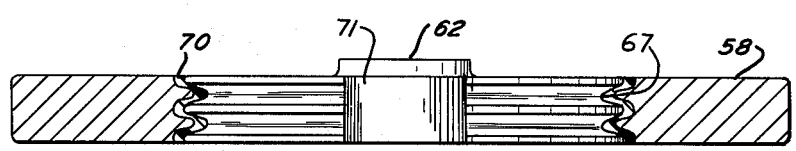
FIGURE 8 is a sectional view taken along line 8—8 in FIGURE 6.

In order to assemble the tire 56, the rim and hub are first inserted in the tire 58 as illustrated in FIGURE 7 and then shuttled back and forth across the opening in the tire until these elements assume the position in FIGURE 8. The presence of the flat portion 69 and 71 permit the rim to be inserted because the ribs 66 on the rim do not overlap the ribs on the tire for a full 360°. Thereafter, material 70 is introduced into the gap between the ribs. Material 70 may be identical with material 42 and may be introduced in the same manner. While the gap between the ribs is similar in contour with the contour of the gap in wheel 10, the gap of wheel 56 is defined by concentric grooves and ribs.

The design of the foregoing described wheels is such that for a tire five and one-quarter inches wide, and with the above-described threads, the area subjected to shear stresses in acceleration and deceleration of a load of 12,500 pounds per wheel at a rate of 3.5 miles per hour per second is 990 square inches, and shear stress in the resilient material is about 2.5 pounds per square inch.

A radial load of 12,500 pounds per wheel produces a compression stress in the resilient material. Assuming that only seventy percent of the projected area in compression is effective, an equal area on the top side of the wheel is in tension and five and one-half times this area is in shear. As the stress versus strain rate is approximately equal in compression, tension and shear in the low elongation range, that is less than fifteen percent, the resultant stress in the material is about thirty-four pounds per square inch.

A load applied to the flange of the wheel in a direction parallel to the axle, such as a resultant of traveling around a curve in the track, may be as high as 21,900 pounds per wheel. This load is resisted by the sides of the threads, one side in compression and the other side in tension. The total area in compression is 342 square inches and an equal area is in tension.

Inasmuch as the stresses are at a maximum at the point of contact with the rail and also diametrically opposite thereto, and decrease to zero at 2 points 90° from the aforementioned two points and there change from compression to tension and from tension to compression, the effective area resisting the flange load is seventy percent of the area of the sides of the threads opposed. The effective radius is also seventy percent of the mean radius to the pitched line of the two threads.

From the above geometry it may be seen that tension and compression stresses in the resilient material are about thirty-five pounds per square inch.

The vector summation of all the maximum stresses occuring simultaneously is therefore sixty pounds per square inch. This stress is well within the working stress limits of the material suggested for this application.

The present invention may be embodied in other specific forms without departing from the spirit or essential attributes thereof and, accordingly, reference should be made to the appended claim, rather than to the foregoing specification as indicating the scope of the invention.

What is claimed:

1. A railroad wheel comprising a hub, a rim connected to and disposed around said hub, a metal tire around and spaced from said rim, and a layer of sound absorbing material between and bonded to circumferential ribs on the inner periphery of said tire and bonded to the ribs on the outer periphery of said rim, and a pair of diametrically opposed flat portions on opposite sides of said rim.

2. A railroad wheel in accordance with claim 1 wherein said ribs have flat sides, rounded roots and rounded crests.

3. A railroad wheel in accordance with claim 1 wherein the distance from crest to crest of the ribs is greater than or equal to five-sixteenth of an inch but less than or equal to seven-sixteenths of an inch.

4. A railroad wheel in accordance with claim 1 wherein the ribs increase the juxtaposed area between the tire and rim by a ratio of at least 2:1.

5. A railroad wheel comprising a hub, a rim connected to and disposed around said hub, a metal tire around and spaced from said rim, and a layer of elastomeric material between and bonded to the outer periphery of said rim and the inner periphery of said tire, helical threads on the outer periphery of said rim spaced from and meshed with helical threads on the inner periphery of said tire, said material being in the space between said threads, said threads being adapted to optimally balance the dynamic stresses in the elastomeric material, the distance across said spece between said threads being about $\frac{1}{16}$ of an inch, and the number of threads per inch on said rim and tire being sufficient to increase the juxtaposed area between the tire and rim by a ratio of at least 2:1.

6. A railroad wheel comprising a hub, a rim connected to and disposed around said hub, a metal tire around and spaced from said rim, and a layer of elastomeric material between and bonded to the outer periphery of said rim and the inner periphery of said tire, helical threads having crests and roots on the outer periphery of said rim spaced from and meshed with helical threads having crests and roots on the inner periphery of said tire, said elastomeric material being in the space between said threads, said threads being adapted to optimally balance the dynamic stresses in the elastomeric material, the distance from crest to crest and root to root of said threads being greater than or equal to $5/16$ of an inch but less than or equal to $7/16$ of an inch, and the distance across the space between said threads being equal to about $1/16$ of an inch.

7. A railroad wheel in accordance with claim 5 wherein said threads are modified V threads having rounded crests and roots.

8. A railroad wheel in accordance with claim 6 wherein said threads are modified V threads having rounded crests and roots.

9. A railroad wheel comprising a center portion, said center portion having circular ribs on its outer periphery, an annular tire portion, said tire portion having circular ribs on its inner periphery, said ribs on said tire portion being complementary to and having crests of greater diameter than the roots of said ribs on said center portion, a radial clearance space between said ribs on said tire and said ribs on said center portion, said rim having two diametrically opposed first portions on the outer periphery thereof, said flat portions defining sufficiently large segments of the periphery of said rim wherein there is non-interference between said rim and the ribs on said tire thereby enabling the rim to be assembled concentrically to the tire, and an elastomeric material in the radial clearance space for maintaining said center portion and said tire portion in spaced relation.

10. A railroad wheel as set forth in claim 9 wherein the radial distance between the center of said center portion and the ribs on said center portion is greater than the radial distance between the center of said center portion and the ribs on said tire portion.

UNITED STATES PATENTS

References Cited by the Examiner

| 2,037,188 | 4/1936 | Wittmer | 295—11 |
| 2,659,622 | 11/1953 | Watter | 295—11 |

ARTHUR L. LA POINT, *Primary Examiner.*

C. W. HAEFELE, *Assistant Examiner.*